United States Patent

[11] 3,617,995

[72] Inventor Thomas A. Goulet
 Reseda, Calif.
[21] Appl. No. 814,987
[22] Filed Apr. 10, 1969
[45] Patented Nov. 2, 1971
[73] Assignee The Marquardt Corporation
 Van Nuys, Calif.

[54] NONUNIFORM PULSE SONAR NAVIGATION SYSTEM
 10 Claims, 5 Drawing Figs.
[52] U.S. Cl. ............................................. 340/3 R, 340/3 D, 343/8
[51] Int. Cl. ............................................. G01s 9/66
[50] Field of Search ............................................. 340/3, 3 D; 343/8

[56] References Cited
 UNITED STATES PATENTS
 3,121,856 2/1964 Finney ........................ 340/3

Primary Examiner—Richard A. Farley
Attorney—Robert E. Geauque

ABSTRACT: A nonuniform pulse sonar system employing Doppler information for navigational purposes is disclosed. A train of pulses including a plurality of energy pulses having varying predetermined widths and spacing is provided by a nonuniform pulse generator to energize a transducer which serves as a projector adapted to transmit acoustical energy into a body of water. Reflected energy is sensed by the transducer, which also serves as a hydrophone, and subsequently processed by a tracker which selects and reproduces, as a continuous frequency signal, the predominant frequency in the frequency spectrum of the reflected energy detected. A demodulator unit is employed to compare the continuous frequency signal with the frequency of the energy pulses used to energize the transducer, the frequency difference constituting a Doppler frequency that is proportional to the velocity of a craft, on which the sonar system is mounted, relative to the object, or objects, such as the ocean floor, from which the transmitted energy is reflected.

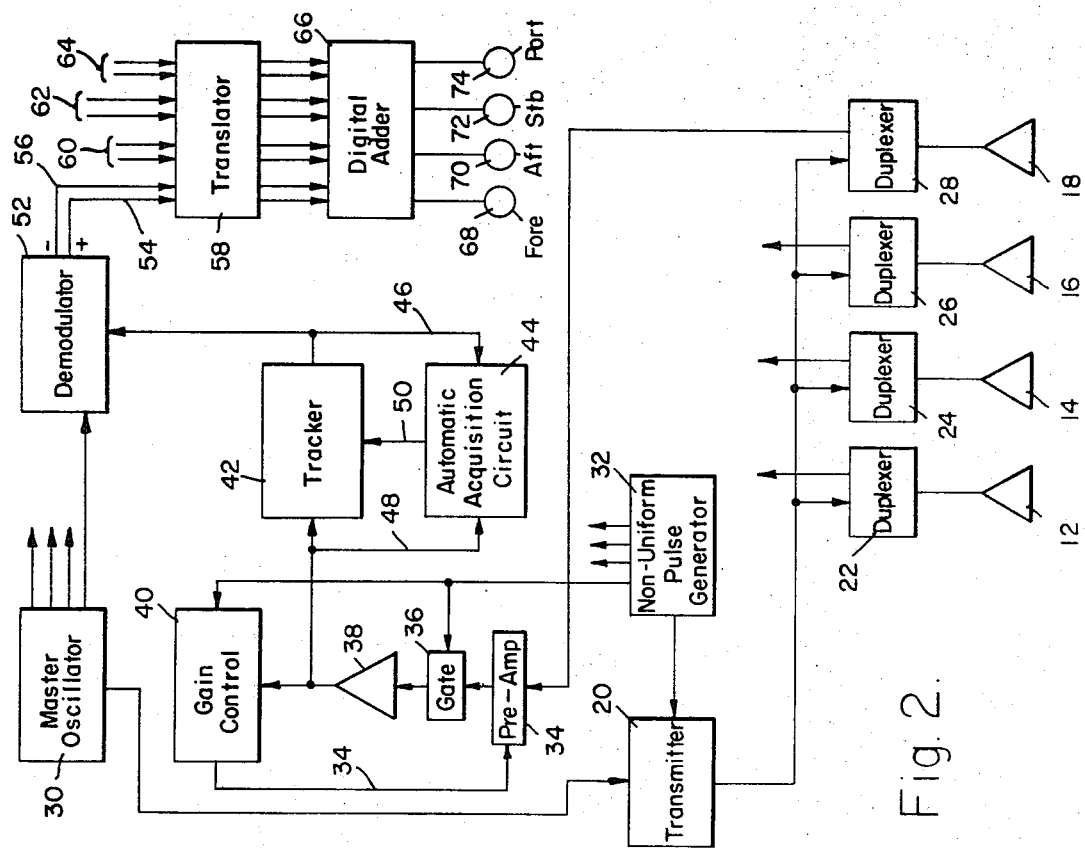
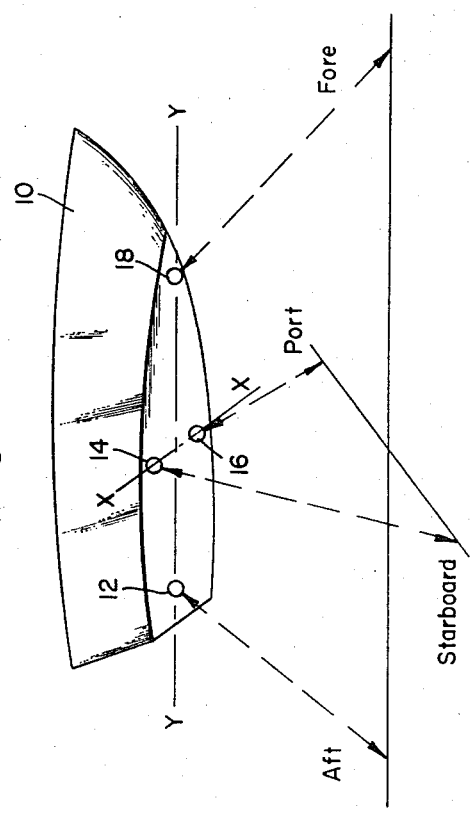

Thomas A. Goulet,
INVENTOR.
BY.

R. E. Grangue
ATTORNEY.

NONUNIFORM PULSE SONAR NAVIGATION SYSTEM

BACKGROUND OF THE INVENTION

This invention relates to Doppler navigational apparatus and more particularly to a novel sonar navigation system for determining the velocity of a marine vehicle or craft relative to the floor or bottom of a body of water.

Several Doppler navigation systems are currently in use on military and civilian aircraft and marine vehicles. These systems include various radar and sonar devices which involve the well-known Doppler phenomenon wherein the Doppler frequency shift of received signals, relative to the frequency of transmitted signals that are reflected by terrain below the craft or vehicle, is detected. Among these Doppler navigation systems are sonar systems which include transmitting and receiving equipment adapted to detect the Doppler frequency shift of sound waves reflected by the ocean bottom. The principles of operation in the radar and sonar systems are generally the same, the structural differences in the apparatus employed being primarily necessitated by differences in frequency, propagation velocity, craft velocity, and techniques for detecting and transmitting.

Generally, Doppler sonar systems that are available in the prior art employ a continuous wave sonar Doppler device that will accept all information resulting from the transmitted signals. Since the information is at a continuous rate, it is not possible to time discriminate in an effort to separate Doppler frequencies between fixed and moving objects. Additionally, a crosstalk between the transmitter and receiver is a problem in continuous wave systems, as well as the adverse signal effects derived because of "volume reverberation." By volume reverberation, it is meant that sea water, in contrast to fresh water, contains millions of micro-organisms in a more or less uniform manner throughout temperate and tropic regions of the world. These micro-organisms, and the gas bubbles they create, produce a back-scattering phenomenon which is known to those skilled in the sonar art as volume reverberation.

Among some of the prior art devices employing continuous wave transmission which suffer from the above difficulties and problems are those represented in the disclosures of U.S. Pat. Nos. 2,912,671; 2,961,190; 3,065,463; and 3,231,852. All of these systems employ a continuous wave transmission technique in which crosstalk is a problem, the necessity of both a transmitter and a receiver, and the inability of the continuous wave transmission system to accurately navigate from volume reverberation signals in a disturbed water environment.

Pulse Doppler principles, in a general form, have been employed in radar devices to detect and monitor relative motion. However, these devices have employed a pulse system for purposes other than those involved in the present invention. For example, pulse techniques have been employed in radar systems to increase the ratio of peak power to average power above unity to produce greater range, to reduce power consumption, and to allow a single antenna to be employed for transmission as well as for reception by time sharing the antenna. Inasmuch as the medium through which energy is propagated in sonar systems is water, these reasons are not applicable for sonar navigational purposes.

To the extent that pulse Doppler techniques have been employed with sonar systems, a uniform pulse train has generally been used. In the use of a uniform pulse train, however, the pulsed transmission, and consequently the pulsed return signal, contains frequency sidebands in addition to the transmitted frequency. These frequency sidebands are generally constant and of sufficient power level to produce navigational errors as a result of the tracking apparatus incorrectly locking onto a sideband frequency.

These navigational errors can be eliminated if the power level of the sidebands is reduced and the sideband frequencies are caused to vary instead of being allowed to remain constant. This can be accomplished by transmitting a train of pulses of varying width and spacing, and it is this technique that is employed in the present invention.

SUMMARY OF THE INVENTION

Briefly described, the present invention involves a pulse sonar system that is free from the problems and difficulties encountered with prior art systems.

More particularly, a pulse sonar system adapted to project a train of pulses including pulses of varying width and spacing is provided. Projected energy that is reflected by the ocean floor as well as other objects in the path of propagation is sensed by an appropriate transducer and then processed by a tracker. A demodulator unit is employed to determine the frequency difference between the transmitted and received signals. This frequency difference, which constitutes a Doppler frequency, is proportional to the velocity of the craft bearing the sonar system relative to the ocean floor.

It is therefore an object of the present invention to provide an improved pulsed sonar navigational system for determining the relative velocity of a marine vehicle.

A further object of the present invention is to provide a pulsed sonar navigational system that is immuned to navigational errors caused by received sideband signals.

Another object of the present invention is to provide a pulsed sonar system in which a nonuniform pulsed train is transmitted to effect a reduction in the power level of sideband frequency signals.

DESCRIPTION OF THE DRAWINGS

Other objects, and many of the attendant advantages of this invention will be more readily appreciated as the same becomes better understood by reference to the following detailed description, which is to be considered in connection with the accompanying drawings in which like reference symbols designate like parts throughout the figures thereof and wherein:

FIG. 1 is a schematic illustration of an exemplary configuration of an acoustical transducer array which is mounted on the hull of a marine vehicle;

FIG. 2 is a general block diagram illustrating a pulsed sonar system in accordance with the present invention;

DESCRIPTION OF THE PREFERRED EMBODIMENT

Figure 5:
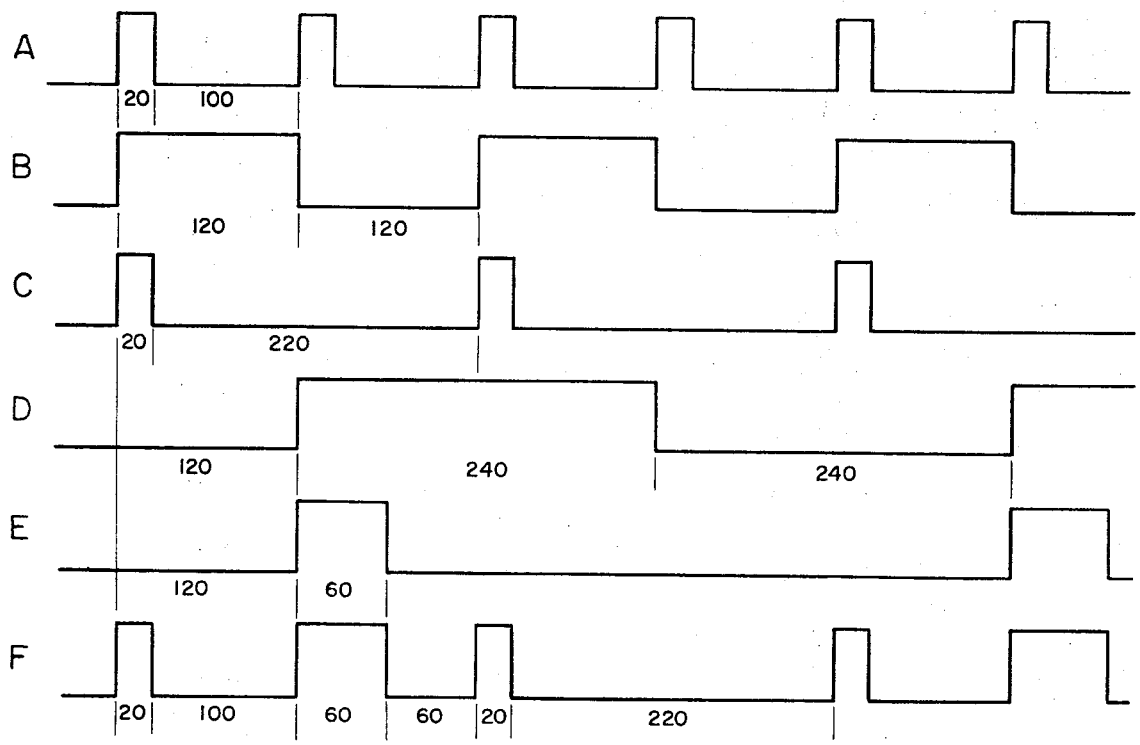
FIG. 5 is a schematic diagram illustrating waveforms that are useful in explaining the operation of the nonuniform pulsed generator illustrated by FIG. 4.

Referring to FIG. 1, a marine vehicle 10 may be employed to carry a pulsed sonar navigational system. For purposes of explanation the fore-aft axis of the vehicle 10 has been designated the y-axis and the port-starboard axis has been designated the x-axis, as illustrated. A plurality of acoustical transducers 12, 14, 16 and 18 may be mounted on the hull of the vehicle 10 along the x- and y-axes in a noncritical fixed spaced-apart relationship. The acoustical transducers 12, 14, 16 and 18 y-axis preferably highly directional transducers which may be used for both projection of acoustical signals and for sensing acoustical signals and may be any of the various types of transducers well known in the prior art. If desired, the transducers may be arranged in a cluster outwardly extending from the side of the craft 10 instead of on the bottom of the craft 10 as illustrated. For present purposes it is sufficient to note that the transducers produce, when operating in the propagation mode, narrow beams of ultrasonic energy which are backscattered or reflected from the ocean floor. In an operative embodiment the beams were radiated at an angle of approximately 30° with respect to a vertical line extending through the vehicle 10 and with a width of approximately 3°. It is to be noted that separate transducers may be employed for the purpose of transmitting and of receiving.

Consistent with the present invention is the fact that the floor of the ocean, or of any body of water, generally is not perfectly flat and will therefore reflect impinging ultrasonic energy in all directions such that at least some of the energy projected by the respective transducers 12, 14, 16 and 18 will be reflected in the direction of the transducers. It will become more apparent that the use of two transducers along each axis, for example, transducers 12 and 16 along the Y-axis serves to compensate for frequency changes caused by roll, pitch or yaw of the vehicle 10.

Referring to FIG. 2, a transmitter 20 applies radio energy to the acoustical transducers 12, 14, 16 and 18 through the respective duplexers 22, 24, 26 and 28. A master oscillator 30 may be employed to provide RF energy to the transmitter 20. In an operative embodiment, 300 kHz. has been found to be a suitable frequency. Blanking signals for appropriately turning the transmitter on and off to produce the desired series of pulses to be projected by the transducers 12, 14, 16 and 18 are provided by a nonuniform pulse generator 32.

As earlier mentioned, navigational errors can be eliminated or otherwise reduced if the power level and constancy of received sidelobe frequencies is reduced. These sidelobe frequencies are produced as a result of the constant pulse repetition frequency of uniform pulse trains employed in prior art pulsed sonar systems. It has been found that if a nonuniform pulse train is employed in the transmission of ultrasonic signals, the same sidelobe frequencies are not constantly received. Further, those sidelobe frequencies that are received have a power level that is significantly less than the power level of the central frequency that is to be tracked. The result is that the tracker circuitry, employed in sonar systems, will more easily fix on the central frequency and ignore the sidelobe frequencies, resulting navigational errors being thereby eliminated and/or reduced.

The projected or transmitted pulsed signals are directed in the direction of the ocean floor and are subsequently backscattered or reflected in the direction of the acoustical transducers 12, 14, 16 and 18 which serve, when operating in a receive mode, to convert acoustical energy to electrical energy. It is to be understood that each of the transducers 12, 14, 16 and 18 will, generally speaking, sense or receive only that reflected energy that was originally projected by the same transducer. For example, transducer 12 will sense only the reflected energy that was originally projected by transducer 12.

The electrical energy provided by each of the transducers is applied through the respective duplexers 22, 24, 26 and 28 to a receiver circuit. For purposes of explanation only the receiver circuitry associated with the duplexer 28 has been illustrated in FIG. 2 although it is to be understood that a sonar system, in accordance with the present invention, would include a receiver circuit for each of the respective transducers employed.

Received signals are applied through a preamplifier 34, a gating circuit 36, and an amplifier 38 to a gain control circuit 40, a tracker circuit 42 and an automatic acquisition circuit 44. The gain control circuit 40, which will be described hereinafter in connection with FIG. 3, produces an output signal which is applied as a feedback signal over the lead 44 to the preamplifier circuit 34.

Protection of the receiver circuit is provided by reducing the gain of return signals. This is accomplished by applying the nonuniform pulse train provided by the pulse generator 32 to the gating circuit 36, and to a gating circuit in the gain control 40. The gating circuits serve to block the passage of signals during the period in which pulses are being applied thereto.

The tracker circuit 42 generally serves to provide a continuous signal having a frequency the same as that of the received pulse signals. The tracker circuit 42 is commonly referred to by those skilled in the art as a phase lock loop which locks upon itself in terms of both frequency and phase. A phase lock loop would generally include a voltage controlled oscillator and a control circuit which is a combination of an amplifier and an integrator. Any of the phase lock loop circuits well known in the prior art may be employed in the tracker circuit 42 to accomplish the desired purpose. Within the tracker 42, a comparison is made between the voltage controlled oscillator output and the pulsed incoming signal, a difference signal being produced which presents a difference not only in frequency but in phase. This latter signal is then processed by the VCO control circuit which steers the voltage controlled oscillator to the phase and frequency that is necessary to attain exact synchronization with the incoming signal frequency from the amplifier 38. It is to be kept in mind that the reference frequency of the voltage controlled oscillator is a continuous frequency and the frequency of the incoming signal from the amplifier 38 is pulsed information. As a result, the tracker 42 is intended to be in operation only during the period in which the signal from the amplifier 38 is received. For this purpose the difference signals generated by the tracker 42 are applied to the acquisition circuit 44 over a lead 46 while received signals are applied through the preamplifier 34, the gating circuit 36, and the amplifier 38 to the automatic acquisition circuit 44 by way of a lead 48. The output of the automatic acquisition circuit is applied back to the track circuit 42 over a lead 50. The automatic acquisition circuit 44 serves to sychronize the voltage controlled oscillator signals with the frequency of the received signals.

In general, the automatic acquisition circuit 44 includes a discriminator, which is a part of the phase lock loop in the tracker 42, and a shorting switch coupled between the integrator of the VCO control circuit and the discriminator such that when the switch is shorted or closed, the VCO control circuit will hold and control the voltage controlled oscillator in such a manner that it will not change frequency but will continue to produce the frequency as of the last information received.

The acquisition circuit may employ logic information from a phase detector and a coherent detector to control the switch for shorting out the signal appearing over the lead 50. This results in the integrator output effecting a change in the frequency of the voltage control oscillator in the direction of the frequency of received signals such that frequency coincidence, and as a consequence frequency lock, can occur. An exemplary automatic acquisition circuit is described in detail in a copending U.S. Pat. application, Ser. No. 737,123, filed June 14, 1968, by Thomas A. Goulet and Irving A. Sofen, entitled "Pulse Sonar Navigational System" and assigned to the same assignee as the instant invention.

The output of the tracker circuit 42 is also applied to a demodulator unit 52 which is coupled to the master oscillator 30. The demodulator unit 31 serves to compare the originally transmitted frequency provided by the oscillator 30 with the frequency of the continuous signal provided by the voltage controlled oscillator in the tracker circuit 42. The result of this comparison is a frequency difference which constitutes the Doppler frequency caused by the relative movement between the transducers mounted on the hull of the marine vehicle 10 and the ocean floor.

The demodulator unit 52 is adapted to provide a pair of output signals, one over each of two channels, the signals being respectively a positive Doppler signal and a negative Doppler signal. These outputs are generated in a fashion such that they will not occur simultaneously but instead in sequence. In operation, the signal generated by the master oscillator 30 is supplied to each of the two channels of the demodulator unit 52. The oscillator frequency signal is phase shifted by 90 degrees before being applied to one channel and applied directly to the other channel such that both 0° and 90° phases are used for demodulating purposes. The frequency of the continuous signal provided by the tracker 42 is compared to this oscillator frequency in each of the separate demodulator channels. If the Doppler frequency is positive, indicating a closing rate, an output signal will first occur on the positive demodulator lead 54. If the Doppler frequency is negative, indicating a down or opening rate, an output signal will first occur on the negative demodulator lead 56.

The outputs of the demodulator 52 are applied to a translator 58. It is to be noted that in addition to the output shown from the demodulator unit 52, three additional pairs of demodulator output leads are shown as indicated by the numerals 60, 62 and 64 which are respectively connected to circuitry similar to that just described in connection with the transducer 18.

After the signals are applied to the translator, the signals from the various channels of the system occupy sequential time channels and therefore do not occur simultaneously. The signals are then processed so as to then be digitally added in an adder 66 which serves to sum the signals from the various outputs of the translator 58 in such a fashion that the resulting signals represent four velocities which may be displayed over a plurality of suitable indicator devices 68, 70, 72 and 74, which velocities are respectively indicative of fore-velocity, aft-velocity, starboard-velocity and port-velocity.

Figure 3:
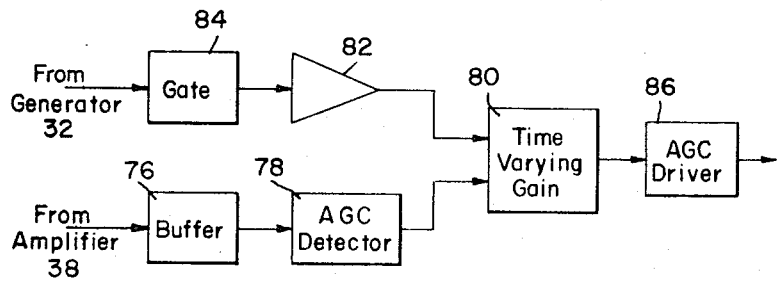
FIG. 3 is a block diagram illustrating an exemplary gain control circuit that may be employed in the system illustrated by FIG. 2.

Referring to FIG. 3, an exemplary gain control circuit 40 is illustrated. More particularly received signals are applied from the amplifier 38 (FIG. 2) through a buffer circuit 76 to an automatic gain control detector circuit 78. The signals provided by the automatic gain control detector circuit 78 are applied to a time varying gain circuit 80. Signals are also applied to the time varying gain circuit 80 through an amplifier 82 and a gate 84, coupled in series, which gate 84 is coupled to the nonuniform pulse generator 32 (FIG. 2). The gate 84, which receives pulses from the nonuniform pulse generator 32, serves to reduce the gain of the receiver during the transmit period. The time varying gain circuit 80, after the period that the gain has been reduced by the gate 84, is adapted to effect normal gain according to a preset time constant.

The time varying gain control circuit 80 may include, for example, an RC network for establishing the decay of gain as it reverts to normal gain according to the time constant provided for by the RC network.

The automatic gain control loop formed by the buffer 76, the AGC detector 78, the time varying gain circuit 80, the AGC driver 86, and the preamplifier 34 serves to control the overall gain of return signals to be processed by regulating amplification of the preamplifier 34. As the preamplifier 34 is driven more positive by signals from the AGC driver 86, the gain of the signal is reduced. Conversely, when the preamplifier 34 is driven more negative the signal gain is increased proportionately.

Figure 4:
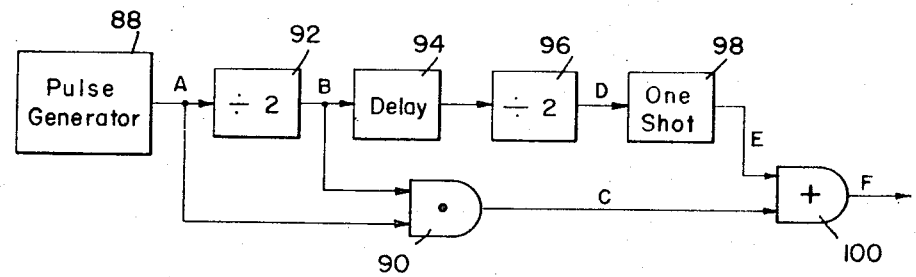
FIG. 4 is a block diagram illustrating an exemplary nonuniform pulsed generator that may be included in the system illustrated by FIG. 2.

An exemplary nonuniform pulse generator circuit 32 is illustrated in FIG. 4. A pulse generator 88 is provided to supply a uniform train of pulses each having a 20 microsecond $\mu$sec. duration, or pulse width, wherein each pulse is separated by a 100 $\mu$sec. spacing as illustrated in FIG. 5A. This train of pulses is applied to an AND gate 90 as one input thereto and to a divider circuit 92 which may be a multivibrator circuit of a type well known in the prior art. The divider circuit 92 serves to provide a positive pulse corresponding to every other pulse applied thereto from the pulse generator 88. The pulse train provided by the divider circuit 92, as illustrated by FIG. 5B, is applied as the second input to the AND gate 90. The AND gate 90 will provide a pulse having a 20 $\mu$sec. duration or pulse width whenever there is coincidence between the signals applied from the pulse generator 88 and the divider circuit 92. The pulse train provided by the AND gate 90, as illustrated in FIG. 5C, is applied to an OR gate 92.

The pulse train provided by the divider 92 is applied through a delay line 94 to a second divider circuit 96. The delay is of a duration to cause the pulses provided by the divider 92 to be delayed a length of time equivalent to the duration between the leading edges of the pulses provided by pulse generator 88. In the present example, the delay 94 would be equal to 120 $\mu$sec. The delayed pulse train provided by the divider 96, illustrated by FIG. 5D, is applied to a one-shot circuit 98 which serves to provide a 60 $\mu$sec. pulse whenever a positive pulse from the divider 96 is applied thereto. This 60 $\mu$sec. pulse is applied to the OR gate 92 as a second input thereto. The pulse train provided by the one-shot circuit 98 is illustrated by FIG. 5E. The output of the OR gate 92, illustrated by FIG. 5F, will be a nonuniform pulse train comprising, in sequence, a 20 $\mu$sec. pulse followed by a 100 $\mu$sec. spacing, a 60 $\mu$sec. pulse followed by a 60 $\mu$sec. spacing, and a 20 $\mu$sec. pulse followed by a 220 $\mu$sec. spacing. Identical cycles of these three pulses with the described spacings will then follow to form the desired nonuniform pulse train which is, as earlier explained, applied to the transmitter 20, the gate 36, and the gain control circuit 40.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. A pulsed sonar system for use with a marine vehicle, said sonar system comprising:
    projector means for projecting a train of nonuniform pulsed acoustical signals into a body of water, said projector means including an oscillator for providing a master signal having a selected frequency;
    receiver means for generating a train of pulsed electrical signals representing reflected portions of said pulsed acoustical signals;
    tracking means responsive to said pulsed electrical signals for generating a continuous signal having a frequency corresponding to the frequency of said electrical signals;
    demodulator means for comparing the frequency of said continuous signal with the frequency of said master signal to develop a difference frequency signal; and
    means for processing said difference frequency signal to determine the velocity of said marine vehicle.

2. The sonar system defined by claim 1 wherein said projector means further includes:
    a transmitter, operatively coupled to said oscillator, for generating pulsed transmit signals;
    nonuniform pulse generator means for controlling the width and spacing of successive ones of said pulsed transmit signals; and
    acoustical transducer means, operatively coupled to said transmitter for converting said pulsed transmit signals into pulsed acoustical signals.

3. The sonar system defined by claim 2 wherein said nonuniform pulse generator means comprises:
    first means for generating a train of pulses having a uniform pulse width and spacing;
    second means for blanking alternate ones of said pulses in said train of pulses; and
    third means, operatively coupled to said second means, for replacing alternate ones of the blanked pulses with a pulse having a pulse width not the same as said uniform pulse width.

4. The sonar system defined by claim 2 wherein said acoustical transducer means comprises a plurality of acoustical transducers arranged to project and sense acoustical signals in a plurality of predetermined directions.

5. The sonar system defined by claim 1 wherein said receiver means includes:
    a gain control circuit; and
    means for causing said gain control circuit to reduce the gain of said receiver means for selected periods during which said nonuniform pulsed acoustical signals are being propagated.

6. The sonar system defined by claim 1 wherein said tracking means includes a phase lock loop.

7. The sonar system defined by claim 1 wherein said difference frequency signal represents a Doppler shift frequency that is proportional to the velocity of said marine vehicle.

8. In a pulsed sonar system including a transmitter for generating pulsed acoustical signals in response to electrical signals having a selected master frequency, a receiver for providing pulsed electrical signals in response to reflected acoustic signals, and demodulator means for providing a Doppler shift frequency proportional to the velocity of a marine vehicle by comparing the frequency of said pulsed electrical signals to said master frequency, the improvement comprising nonuniform pulse generator means, operatively coupled to said transmitter, for controlling the pulse width and the pulse spacing of successive ones of said pulsed acoustical signals to be nonuniform in pulse width and pulse spacing.

9. The apparatus defined by claim 8 wherein said nonuniform pulse generator means comprises:
first means for generating a train of pulses having a uniform pulse width and pulse spacing;
second means for effectively eliminating every other successive one of said pulses in said train of pulses; and
third means for replacing every other successive one of the effectively eliminated pulses with a pulse having a predetermined pulse width not the same as said uniform pulse width.

10. The apparatus defined by claim 8 wherein said nonuniform pulse generator means is further operatively coupled to said receiver for reducing the gain of said receiver for selected periods of time during which said pulsed acoustical signals are being generated.

* * * * *